Oct. 25, 1949.                    W. D. PEEL                     2,485,653
                                SEED EXTRACTOR
Filed Sept. 2, 1947                                          6 Sheets-Sheet 1

INVENTOR.
Wirt D. Peel
BY
Philip A. Tridell
Attorney

Oct. 25, 1949.  W. D. PEEL  2,485,653
SEED EXTRACTOR

Filed Sept. 2, 1947  6 Sheets-Sheet 3

INVENTOR.
Wirt D. Peel
BY
Philip A. Tindall
Attorney

Oct. 25, 1949.  W. D. PEEL  2,485,653
SEED EXTRACTOR
Filed Sept. 2, 1947  6 Sheets-Sheet 4
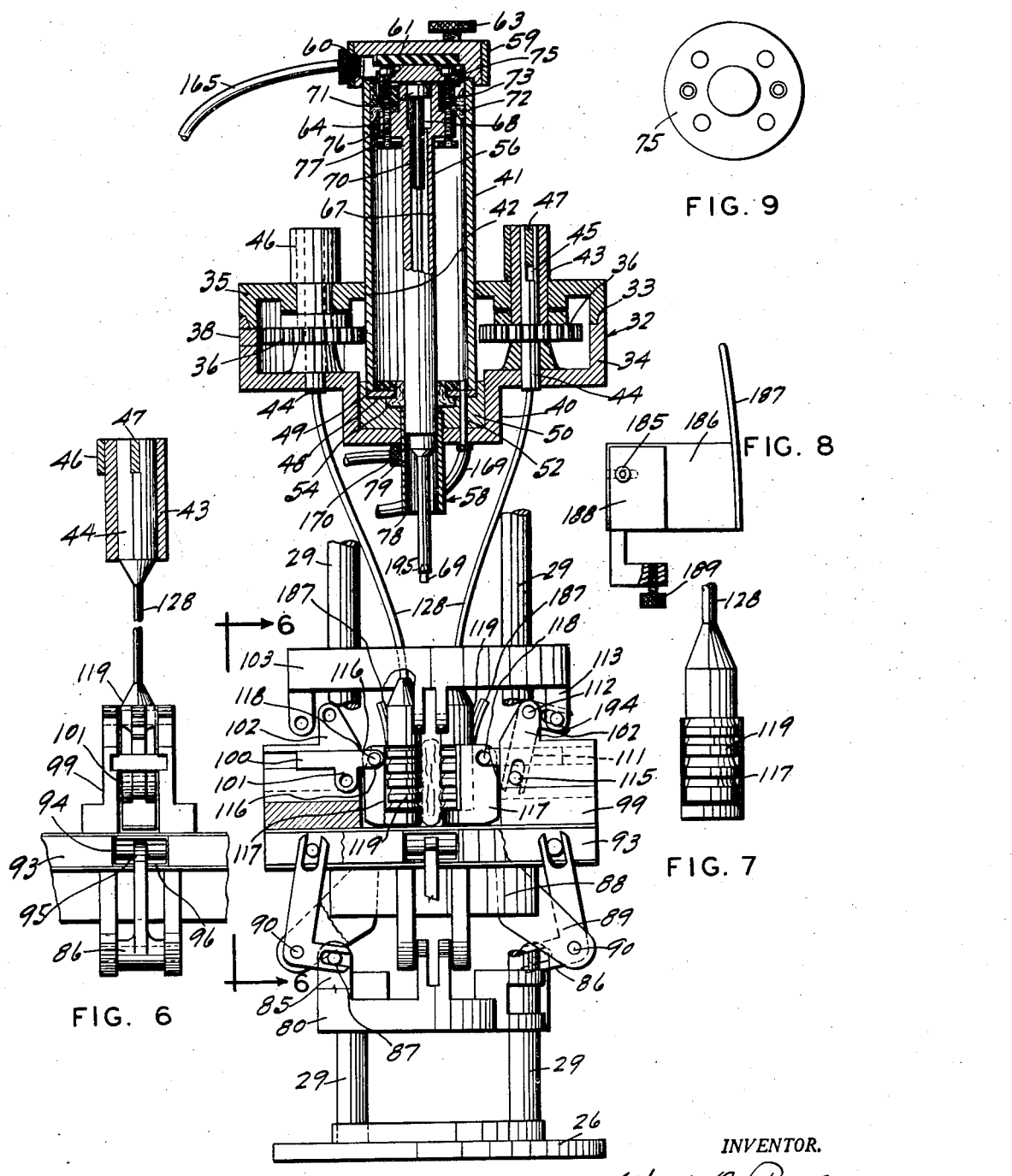

Oct. 25, 1949.   W. D. PEEL   2,485,653
SEED EXTRACTOR
Filed Sept. 2, 1947   6 Sheets-Sheet 5
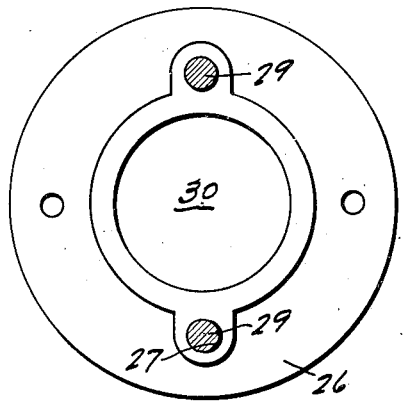
FIG. 10
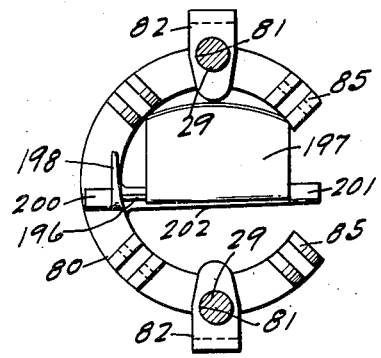
FIG. 12
FIG. 11
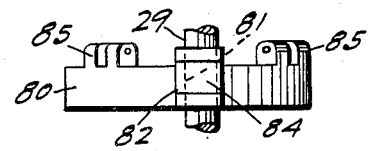
FIG. 13
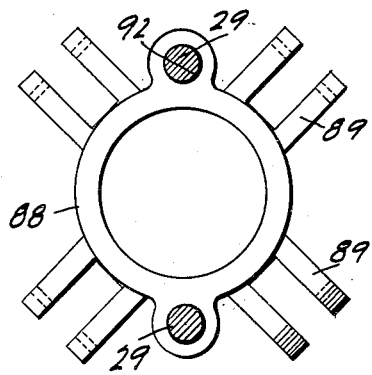
FIG. 14
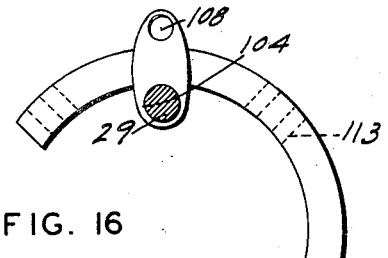
FIG. 16
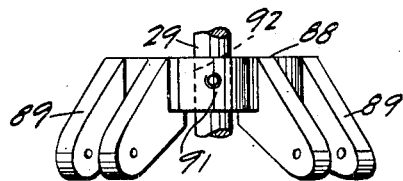
FIG. 15
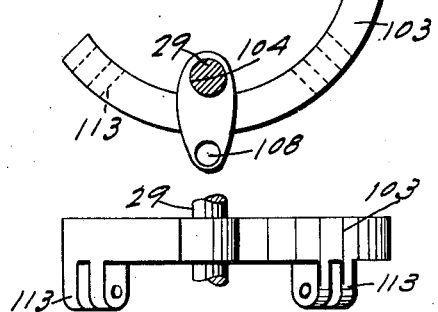
FIG. 17   INVENTOR.

Oct. 25, 1949.  W. D. PEEL  2,485,653
SEED EXTRACTOR
Filed Sept. 2, 1947  6 Sheets-Sheet 6

INVENTOR.
Will D Peel
BY
Philip A. Snider
Attorney

Patented Oct. 25, 1949

2,485,653

UNITED STATES PATENT OFFICE 2,485,653

SEED EXTRACTOR

Wirt D. Peel, Oakland, Calif.

Application September 2, 1947, Serial No. 771,632

17 Claims. (Cl. 146—17)

This invention relates to improvements in seed extractors or fruit pitters, and provides a new, rapid, efficient, clean and sanitary method of removing the seeds from fruits, particularly from evaporated fruits of the date and prune variety.

Fruit pitters have long been known but are generally of the hand operated type, some of which operate through a gripping action and others by turning a crank. However, my invention involves a new principle including a power driven machine which feeds the fruit to the machine, places the fruit in a definite position and centers the fruit, forces the pit out of the fruit, blows the pit clear, then follows by ejecting the fruit and blowing away any fragments to keep the machine relatively clean and free from gummy substances from the fruit.

This machine is automatic in action and requires no attention other than that of maintaining a supply of the fruit in a hopper. The fruit is fed selectively, one at a time, the fruit dropping into the machine and being up-ended and then centered, following which a main plunger moves axially to force the pit through the bottom end of the fruit, followed by an internal plunger and a blast of air through the main plunger to clear the pit from the fruit support, and finally, with retraction of the support from under the fruit and opening of the centering means, a blast of air drives the fruit through to clear the machine and clears away any fragments of fruit, followed immediately by closing of the support for the next single fruit.

The objects and advantages of the invention are as follows:

First, to provide a machine for automatically removing the pits endwise from relatively elongated fruits.

Second, to provide a power operated machine into which individual fruits fed sequentially are located, centered and held in a predetermined position for ejection of the pit lengthwise of the fruit.

Third, to provide a machine as outlined which automatically locates and centers individual specimens of fruit, forces the pit out through the end of the fruit, ejects the pitted fruit, and cleans the fruit engaging parts of the machine of fragments of fruit.

Fourth, to provide a machine as outlined with combined plunger and air jet ejecting means for the fruit pits.

Fifth, to provide a machine as outlined with air jet ejecting means for ejecting the pitted fruit.

Sixth, to provide a machine as outlined with rotative centering means for locating and centering the fruit, converted into stationary holding means when the fruit is located and centered, and returned to rotative means for ejection of the pitted fruit and particles thereof and accompanied by an air blast for ejection.

Seventh, to provide a machine as outlined which is positive in action under normal operating conditions but which is sufficiently resilient to prevent damage to fruits or damage to the machine in the event of overloading due to multiple feeding of fruit or other causes.

Eighth, to provide a machine as outlined which is relatively simple in construction, rapid in operation, adjustable for different types of fruits, with the various elements easily assembled and disassembled or replaced for repairs or to accommodate different types of fruits.

In describing the invention reference will be made to the accompanying drawings, in which:

Fig. 5 is a sectional elevation through the invention showing the interior construction and operating means therefor.

Fig. 6 is a view taken in the direction 6—6 of Fig. 5.

Fig. 7 is an inside view of one of the locating, centering and holding rollers.

Fig. 8 is a side elevation of one of the gauges for directing the fruit between the centering rollers.

Fig. 9 is an enlarged plan view of the piston head valve for controlling the internal ejection plunger.

Fig. 10 is a plan view of the machine base.

Fig. 11 is a side elevation of Fig. 10.

Fig. 12 is a top plan view of the fruit support operating head.

Fig. 13 is a side elevation of Fig. 12.

Fig. 14 is a top plan view of the fruit support base.

Fig. 15 is a side elevation of Fig. 14.

Fig. 16 is a top plan view of the roll operating head.

Fig. 17 is a side elevation of Fig. 16.

Figure 1:
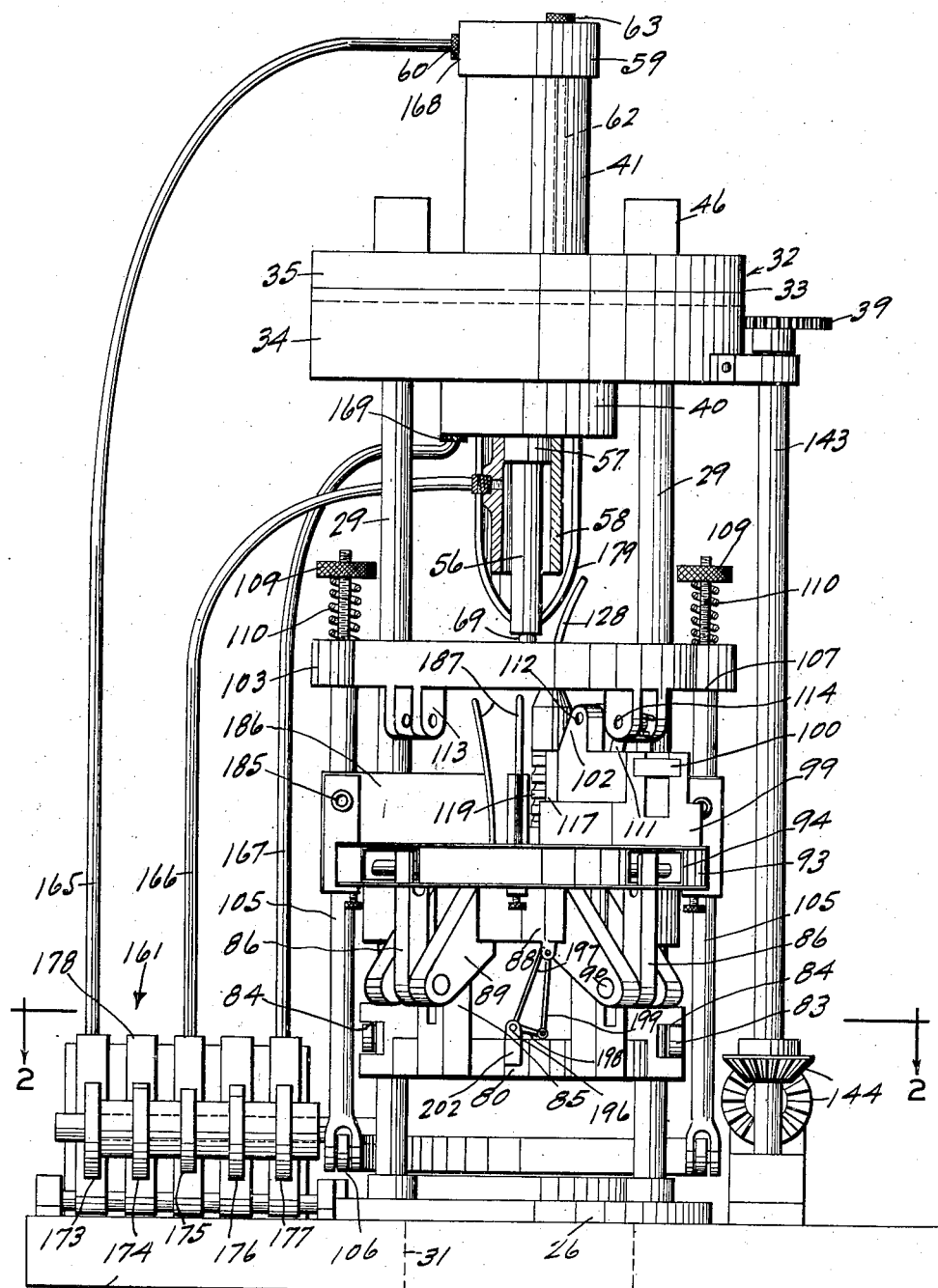
Fig. 1 is a side elevation of the invention with some duplicate parts removed and others shown in section to clearly show the relationship between the various elements.
Figure 2:
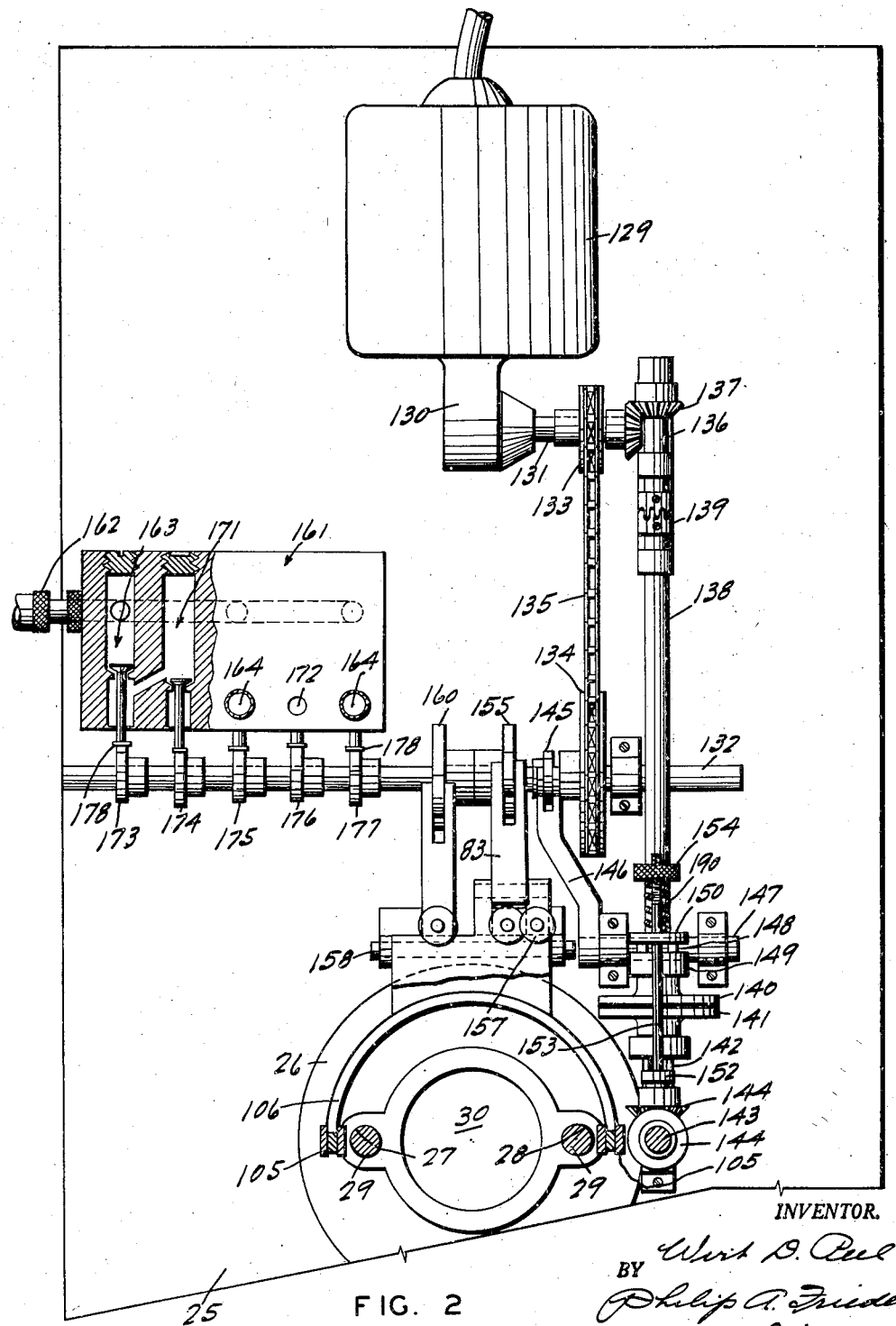
Fig. 2 is a section taken on line 2—2 of Fig. 1.
Figure 4:
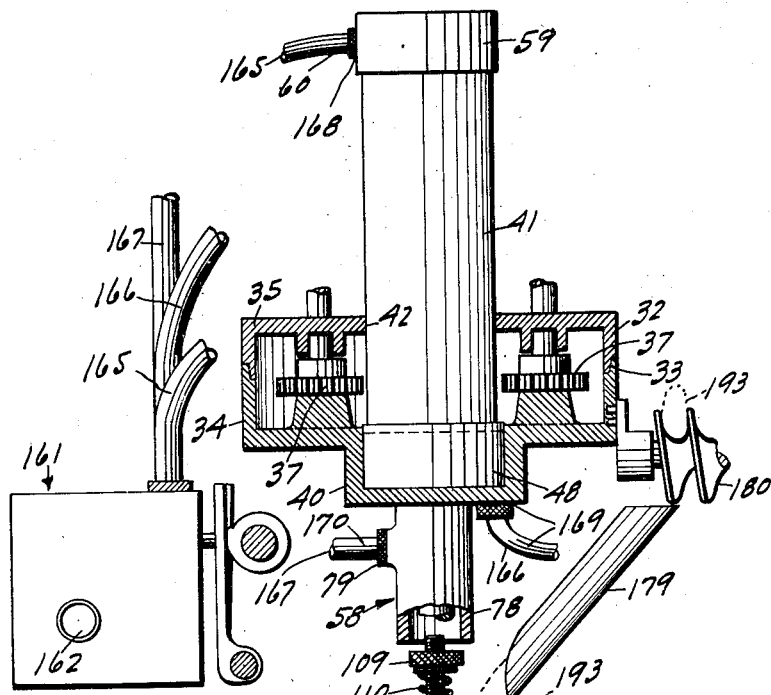
Fig. 4 is an end elevation of the air control valve for controlling operation of the plunger and air blasts.
Figure 3:
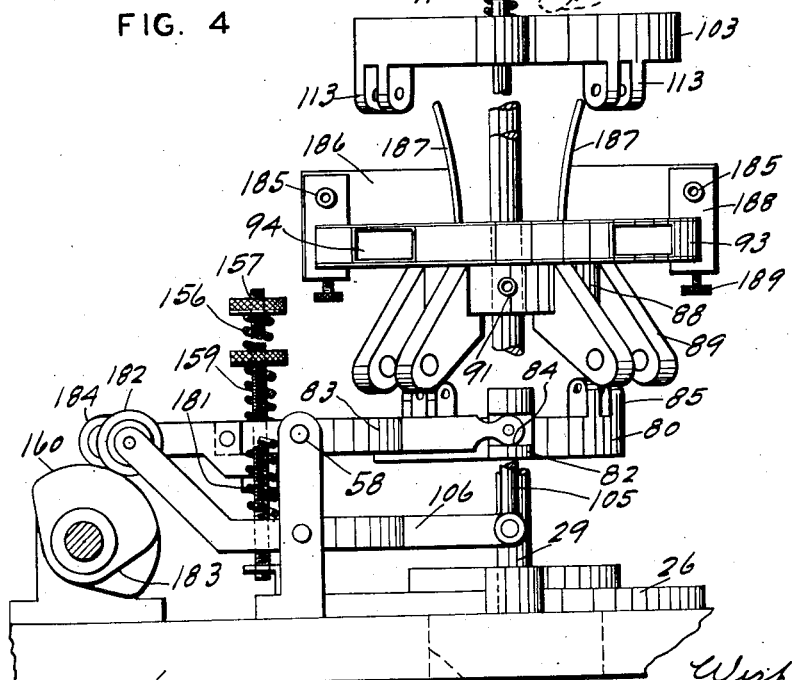
Fig. 3 is a fragmentary view showing the relationship between various operating parts which operate and control the locating, centering and ejecting devices.

The invention includes a base, a head, tie rods connecting the base and head, a cylinder and piston and compressed air control and distributing means, a retractable fruit support and operating means therefor, locating and centering means for the fruit, a dual plunger for the piston and operating as the pit ejector, and driving and timing means and a platform support for the entire machine.

The frame of the machine includes a platform support 25 for support of the various units and driving means on which is supported a base 26 having tie rod holes 27 and 28 for the combined standards and tie rods 29 which are fixedly secured in the base; the base having a central passage 30 for passage of the pits and fruits when ejected; an aligning passage 31 being formed in the platform support, a suitable selector being provided for selective transfer of the pits and pitted fruits to separate receptacles.

Mounted on the upper ends of the tie rods is a combination head, cylinder support and gear box 32 which is separable as indicated at 33 and including a housing 34 and cap 35; the base being secured to the upper ends of the tie rods and the cap being secured to the base by conventional means such as by screws.

Figure 18:
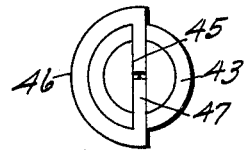
Fig. 18 is an enlarged plan view of the keeper and key means for coupling the tubular shafts to the interior roller driving shafts.
Figure 19:
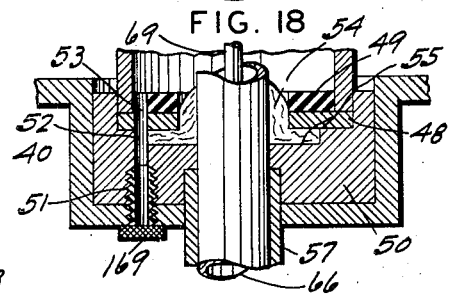
Fig. 19 is an enlarged sectional elevation through the cylinder mounting means and plunger bearing.
Figure 20:
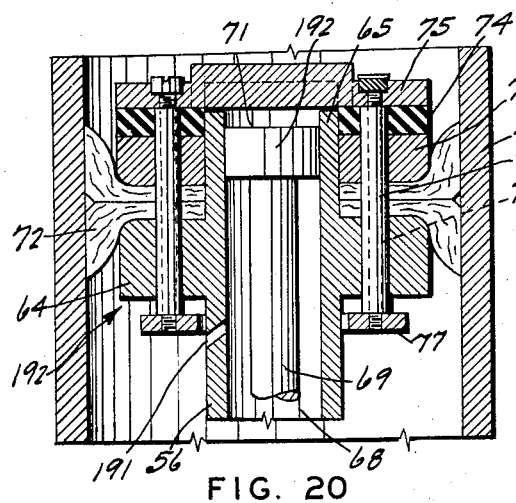
Fig. 20 is an enlarged sectional elevation through the piston.

This housing contains an intermeshing set of four driving gears 36 and four idlers 37 forming a complete circular train within the housing, a gear passage 38 being provided through one side of the housing for the drive gear 39, and this housing is provided with a depending hub 40 for reception of the lower end of the cylinder 41, a passage 42 being axially formed through the cap for this cylinder. The driving gears 36 are each mounted on a hollow shaft 43 having a drive shaft 44 rotatable therein; the hollow and sliding shafts each having a diametric keyway 45 formed therein for a special key and keeper 46 which is formed as indicated in Fig. 18, the portion 47 functioning as a key which is slidable in the diametric keyways 45 to lock the hollow and drive shafts together while permitting sliding action of the inside shaft.

The cylinder 41 is mounted on a special bottom cap 48 which has a rubber facing 49 to function as a bumper and seal, and this cap rests on a special block 50 which fits in the hub 40 and has a pipe tap 51 terminating in a passage 52 alignable with the passage 53 in the cap 48. A piston rod seal 54 is secured between the cap 48 and the bottom 55 of a recess formed in the block and simultaneously seals the end of the cylinder and functions as packing for the plunger 56. A suitable bushing 57 is provided for the plunger, this bushing projecting below the hub for mounting of the fruit ejection jet 58.

The cylinder head 59 is sealed to the upper end of the cylinder and has an air connection 60 communicating with the upper end of the cylinder as shown and is provided with a resilient bumper 61 to absorb the shock of the piston when the piston reaches its upper limit of travel, and the cylinder head, cylinder, and base block are secured into a rigid unit by means of bolts 62 preferably secured by means of knurled nuts 63.

The piston includes a piston block 64 having an integral hub 65 projecting upwardly and an integral plunger 66 extending down through the bushing 57, this plunger having a through bore 66, a first counterbore 67 and a second counterbore 68, and having an internal plunger 69 operating therein freely, this plunger being enlarged at 70 for added strength and terminating in a piston 71. A pair of opposed cup washers 72 are secured between the top shoulder on the piston block and a ring 73 is capped by a rubber or other resilient washer 74 and it in turn capped by a valve head 75, the valve head being secured for very slight axial movement by screws 76 which anchor in the anchor ring 77, with intervening spacers 77'.

Secured on the bushing 57 is a sleeve 78 which surrounds the plunger and extends downwardly and has an air connection 79 though this jet 78 could be made integral with the bushing if desired.

The fruit supporting means consists of the fruit support-operating head 80 which has diametric passages 81 for the tie rods 29, and diametric lugs 82 for the terminal ends of the actuating yoke 83 which is coupled thereto at 84 this head having equally spaced ears 85 in which one end of the bellcrank levers 86 are pivotally secured as indicated at 87; the fruit supporting head 88 which has pairs of ears 89 alignable with the pairs of ears on the member 80 and having the bellcrank levers intermediately pivoted therein as indicated at 90, this head 88 being secured in position on the tie rods as indicated at 91 and therefore being immovable, the tie rods passing through the passages 92.

A housing 93 is mounted on top of the head 88 and includes a series of slides 94 having connection with the other ends of the bellcrank levers as indicated at 95, and each of these slides has a projecting resilient member 96 which close the passage 97 and form a resilient support for the fruit 98.

Slideways 99 are mounted on top of the housing 93 and each carries a slide 100 having a depending ear 101 and the slideways have each an upwardly projecting ear 102, and an operating head 103 for these slides is slidable on the tie rods through passages 104, this operating head having resilient connection with the member 80 through connecting rods 105 which at their lower ends are connected to the yoke 106 with a shoulder 107 formed near the upper end, and with the reduced portion thereabove slidable in the passages 108 and terminating in a threaded end provided with a knurled thrust nut 109 with intervening compression spring 110.

Bellcrank levers 111 are intermediately pivoted to the upstanding ears 102 as indicated at 112 and having one arm pivoted in the depending ears 113 as indicated at 114, and with the other arm pivotally connected to the slide 100 as indicated at 115.

Figure 25:
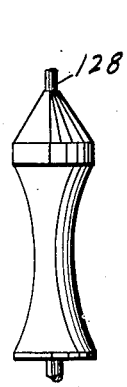
Fig. 25 shows another modification in which the rollers are formed with a concave face.
Figure 24:
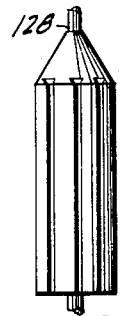
Fig. 24 shows a modification of the rollers in which vertical flutes are formed.

The slides 100 each have an inwardly projecting ear 116 to which is pivoted the roll carrier 117 as indicated at 118 and which carries the locating and centering roller 119 which is pivoted at the lower end as indicated at 120 and has peripheral support in the carrier 117, the upper end of the roller having a flexible driving connection 128 with the inner drive shaft 44, the respective ends of the shaft being fixed respectively in the upper end of the roller and in the lower end of the inner shaft 44. The rollers are formed to suit the specific type of fruit to be pitted, which may require concaved rollers as indicated in Fig. 25 where the fruit is well rounded, or with more flat fruits, may require vertical teeth as indicated in Fig. 24, or any combination of the several types, the type shown in the principal drawings with the annular teeth being the most commonly used type.

The control mechanism for controlling operation of the various mechanical elements includes a motor 129 having a speed reduction at 130 with the slow speed shaft 131 driving a cam shaft 132 through sprockets 133 and 134 and chain 135, and also driving a shaft 136 through the bevel gears 137 which shaft in turn is slidably coupled to a shaft 138 through a suitable coupling or clutch 139 to permit retraction of the shaft to a slight degree, and this last shaft has one element 140 of a friction clutch, the other friction clutch element 141 being mounted on the end of another shaft 142 which drives the vertical shaft 143 through bevel gears 144 and which vertical shaft has the gear 39 secured at the upper end.

The clutch 140—141 is controlled by a cam 145 through an arm 146 which is connected to the rocker shaft 147 and which has a yoke 148 mounted on the other end and which spans the shaft 138 and cooperates between a ball bearing 149 and thrust collar 150. A second collar 151 encompasses the shaft and is tied to a forward bearing 152 through a rod 153 which is readily unhooked and is adjustable by a nut 154 for tension.

The lower operating head 80 is operated by a cam 155 through a yoke 84 which is of the break-arm type or in other words resiliently coupled intermediately at the pivot point 158 and urged together by a spring 156 which is adjustable as to tension by a screw 157, which in case of overload will allow the yoke to break or give at the pivot point 158 to prevent damage to any part of the machine, and this yoke also has a lifter spring 159 for normally raising the yoke and the head 80, while the yoke 106 is rigid, the resiliency being provided through the springs 110, and is actuated by the cam 160, with a spring 181.

The air distributing system consists of a distributor valve 161 which is coupled to a source of air under pressure as indicated at 162 there being three supply valves 163 with outlets 164 connected through the tubes 165, 166 and 167 respectively to the head of the cylinder at 168, to the base of the cylinder at 169, and to the jets 58 at 170; and two discharge valves 171 discharging to atmosphere through the outlets 172.

The valves 163 and 171 are respectively actuated by cams 173, 174, 175, 176 and 177 through levers 178, these cams all being mounted on the cam shaft 132.

Feeding means for feeding one fruit at a time includes a chute 179 and a screw conveyor 180 which is arranged to feed only one fruit at a time to discharge through the chute into the space between the rollers, and driven at such speed as to discharge one fruit for each cycle of operation of the machine.

The operation of the invention is as follows: At the start of a cycle of operations, the head 103 is in its highest position and urged to that position by the spring 181 with the roller 182 riding on the low side 183 of the roller actuating cam 160; the head 80 is in its lowermost position with the roller 184 riding on the high side of the gate closing cam, the four sectors 96 of the gate being closed as indicated in Fig. 23. These gate sectors are formed of live rubber or other resilient material and form the support for the fruit as it is dropped from the chute. With the head 103 in its highest position, the locating and centering rolls 119 are in the retracted and upwardly divergent position illustrated in Fig. 22.

Figure 22:
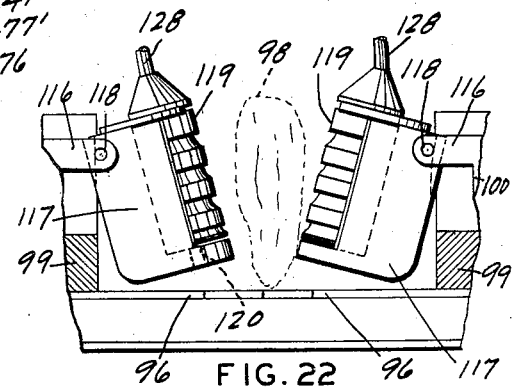
Fig. 22 is a view similar to Fig. 21 except showing the rollers in upwardly divergent open position.
Figure 23:
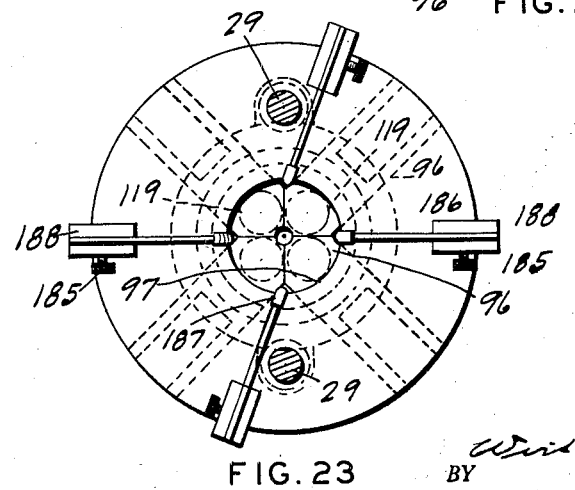
Fig. 23 is a plan view of the gate table showing the gates in closed position and the relative position of the rollers in closed position, and also showing the stationary guards between the rollers.

The gauges, Fig. 8 are adjusted through the medium of the clamp screw 185 which secures the blade 186 carrying the gauge 187 in the frame 188, the frames being secured in position on the gate housing 94 by means of knurled head screws 189, the gauges 187 being located at points between the rollers when the rollers are in open position as indicated in Fig. 22. The plungers 56 and 69 are both in their highest position, with the valve head 75 abutting against the rubber liner 61 of the cylinder head.

The motor 129 is driving the shafts 131, 132 and 139 continuously, and the lever arm 146 is riding the low side of the clutch actuating cam 145, and the spring 199 is urging the clutch element 140 to cooperate with the mating clutch element 141, thus driving the shaft 143, and gear 39 to drive the train of gears 36, 37 the gears 36 driving the rollers 119 through the flexible shafts 128. The valve 173 to the head of the cylinder is closed and the exhaust valve open; the supply valve to the lower end of the cylinder is closed and its exhaust valve closed, and the valve to the jet 58 is also closed, and air is admitted through the passage 191 to the second counterbore 67 continuously, and the piston 192 is in its uppermost position.

Figure 21:
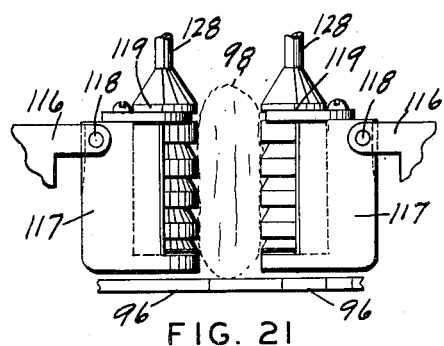
Fig. 21 is an enlarged fragmentary view showing the rollers in closed position.

Starting from this position, a fruit 193 drops down into the chute 179 and thence into the enclosure formed by the opened series of rollers 119 and guards 187, the rollers are rotating continuously, the head 103 is depressed through the action of the cam 160 acting through the connecting rods 105, under the tension of springs 119, depressing the arms 194 of the bellcrank levers and through the other arms righting the rollers to the position shown in Fig. 21 and forwarding the rollers into contact with the fruit, the rollers continuously rotating the fruit as they close in to orient the fruit, and when these rollers have reached their limit of movement, the clutch 140—141 is disengaged, the rollers then remaining stationary.

When this stage is reached, the valve to the head of the cylinder is opened and the lower end of the cylinder is exhausted through its exhaust valve. This drives the piston with its plunger down and through the fruit, forcing the seed through the resilient gate which permits the seed to pass through while holding the fruit.

When the piston has reached the lower end of the cylinder, the ring 77 contacts the rubber washer 49 so that in the final movement of the piston, the piston leaves the valve head which remains stationary and admits air under pressure from the cylinder between the valve head and the rubber valve seat 74, to act on the piston 192, driving the inside plunger through the end 195 of the main plunger and down through the intersection of the gate segments to positively clear the gate of the seed, and immediately the exhaust valve opens to the upper end of the cylinder and the supply valve is opened to the lower part of the cylinder. The air under pressure passes through the passage 191 into the second counterbore, forcing the piston 192 to the top of the main piston and against the valve head, retracting the inside plunger 69 and simultaneously retracting the main plunger by forcing the main piston to the top of the cylinder; air under pressure within the cylinder discharges through the main plunger about the inside plunger to blow the seed clear with a sharp blast of air, and as the plunger starts to retract from the pitted fruit, the rollers again start spreading to the position shown in Fig. 22 and simultaneously start rotating to free the fruit from the plunger and rollers, and, as the rollers release the fruit, the gate opens and a blast of air through the jet 58 forces the fruit through the gate opening and free of the rollers, and immediately thereafter the supply of air to the jet 58 is terminated, with the machine ready for the next fruit element.

As the gates start to open and the rollers start to retract, the downward movement of the member 80 draws down the pivotal point 196 of the deflector 197 while the arm 198 is held stationary by the tie rod 199, thus moving the deflector to the opposite position from that shown in Fig. 1, to discharge the fruit to a different receptacle (not shown) from that to which the seed was forwarded.

As will be noted in Figs. 1 and 12, the deflector is mounted on a pivot or shaft on which the lever 198 is also fixed, and this shaft is reciprocal in the bearings 200 and 201, the bearing 200 being integral with or mounted on the member 80, while the bearing 201 is formed at the end of a bracket 202, this being the simplest way of mounting and operating the deflector for segregation of the fruits and pits, though not limited to this specific structure or method of operation.

Thus the cycle of operations includes: Closing of the gate or fruit support, closing of the rollers on the fruit while the rollers rotate constantly, terminating rotation of the rollers as soon as they have closed on the fruit and depressing the main plunger to force the seed out of the fruit, actuating the inside plunger to clear the seed through the gate and immediately retracting the inside plunger and blasting the seed with air to clear the gate and immediately retracting the main plunger, retracting the rollers and simultaneously initiating rotation to clear the rollers from the fruit and opening the gates or fruit supports and reversing the deflector to discharge the fruit to a different point from that to which the seed was discharged, and blasting the fruit with air to force it through the gate aperture and free of the gate and to clean the rollers of adhering particles.

The friction between the cup leather piston rings and the walls of the cyinder is sufficient to retain the piston and plunger in its topmost position, the air supply being cut off from the lower part of the cylinder as soon as the piston reaches the upper end of the cylinder.

I claim:

1. A fruit pitter, in combination; means for locating, centering and holding a fruit in upright position; a plunger and operating means therefor for forcing the seed out of the fruit; and means for ejecting the pitted fruit; said means for locating, centering and holding a fruit comprising a retractable flexible support for the fruit, a circular series of vertical rollers normally in retracted position for free reception of a fruit therebetween, the reversible actuating means for advancing said rollers toward a common center, and driving means for coincidently rotating said rollers to orient said fruit in said upright position, means for terminating rotation of said rollers when said rollers reach their most advanced position, and for initiating rotation of said rollers following operation of said plunger to free the fruit from the plunger and from the rollers and with said reversible actuating means coincidently retracting said rollers to their normal retracted position.

2. A fruit pitter, in combination; means for locating, centering and holding a fruit in upright position; a plunger and operating means therefor for forcing the seed out of the fruit; and means for ejecting the pitted fruit, said plunger including an internal axial plunger operable when said plunger reaches its lowermost position of travel, with said internal axial plunger advancing beyond the lower end of said plunger to clear the seed from the fruit and including a passage for air under pressure to provide a blast of air from the end of said plunger to clear the retractable flexible support of fragments of fruit.

3. A fruit pitter, in combination; means for locating, centering and holding a fruit in upright position; a plunger and operating means therefor for forcing the seed out of the fruit; and means for ejecting the pitted fruit; said plunger and operating means therefor comprising a cylinder, a piston having an integral hollow plunger and an internal plunger operable within said integral plunger and normally retracted and extending throughout the length thereof and freely fitting within said hollow plunger to provide an air passage, and compressed air distributing means for driving said integral plunger to its lowermost position followed by driving said internal plunger beyond the lower end of said integral plunger, and returning said internal plunger to its raised position within said integral plunger and providing a blast of air through the end of said integral plunger, and returning said integral plunger to its raised position.

4. A fruit pitter, in combination; means for locating, centering and holding a fruit in upright position; a plunger and operating means therefor for forcing the seed out of the fruit; and means for ejecting the pitted fruit, said means for locating, centering and holding a fruit comprising a retractable flexible support for the fruit, a circular series of vertical rollers normally in retracted position for free reception of a fruit therebetween and reversible actuating means for advancing said rollers toward a common center and driving means for coincidently rotating said rollers to orient said fruit in said upright position, means for terminating rotation of said rollers when said rollers reach their most advanced position, and for initiating rotation of said rollers following operation of said plunger to free the fruit from the plunger and from the rollers and with said reversible actuating means coincidently retracting said rollers to their normal retracted position, said plunger including an internal axial plunger operable when said plunger reaches its lowermost position of travel, with said internal axial plunger advancing beyond the lower end of said plunger to clear the seed from the fruit and including a passage for air under pressure to provide a blast of air from the end of the plunger to clear the retractable flexible support of fragments of fruit.

5. A fruit pitter, in combination; means for locating, centering and holding a fruit in upright position; a plunger and operating means therefor for forcing the seed out of the fruit; and means for ejecting the pitted fruit; said means for locating, centering and holding a fruit comprising a retractable flexible support for the fruit, a circular series of vertical rollers normally in retracted position for free reception of a fruit therebetween and reversible actuating means for advancing said rollers toward a common center and driving means for coincidently rotating said rollers to orient said fruit in said upright position, means for terminating rotation of said rollers when said rollers reach their most advanced position, and for initiating rotation of said rollers following operation of said plunger to free the fruit from the plunger and from the rollers and with said reversible actuating means coincidently retracting said rollers to their normal retracted position; said plunger and operating means therefor comprising a cylinder, a piston having an integral hollow plunger and an internal plunger operable within said integral plunger and normally retracted and extending throughout the length thereof and freely fitting within said hollow plunger to provide an air passage, and compressed air distributing means for driving said integral plunger to its lowermost position followed by driving said internal plunger beyond the lower end of said integral plunger, and returning said internal plunger to its raised position within said integral plunger and providing a blast of air through the end of said integral plunger, and returning said integral plunger to its raised position.

6. A fruit pitter comprising; means for supporting a fruit, means for orienting, centering, and holding said fruit in a predetermined position, and a plunger and operating means therefor for forcing the seed through the fruit and for ejecting the pitted fruit; said means for supporting a fruit comprising a plurality of flexible radial gate members, and means for radially advancing and retracting said flexible gate members, for advancing said gate members to form a complete closure to support the fruit; said gate members deflecting under pressure to pass the seed, and being retracted by said means for advancing and retracting to provide an unobstructed passage for ejection of the fruit following operation of said plunger; said means for orienting, centering and holding comprising a circular series of rollers retractable for reception of a fruit therebetween and advanceable to close in and hold the fruit, and rotatable during advancing movement to orient and center the fruit, and during retractive movement to free the fruit from the plunger during withdrawal and from the rollers, and actuating means for advancing and retracting said rollers and for rotating said rollers.

7. A structure as defined in claim 6; said means for actuating including means for retracting said rollers to a divergent position for free reception of a dropping fruit and returning said rollers to a parallel position with the initial advance movement of the rollers.

8. A structure as defined in claim 7; and guides interposed between the respective rollers when in retracted position to guard the spaces between the retracted rollers for retention of the fruit within cooperative relation to the group of rollers.

9. A structure as defined in claim 8; said plunger and operating means therefor comprising a cylinder and a piston with said plunger integral with said piston, and a supply of air under pressure and control means therefor for depressing said plunger to force the seed through the fruit when said fruit is held in the predetermined position, and to return the plunger to its initial position.

10. A structure as defined in claim 9; said plunger having an axial bore terminating in a counterbore at the upper end and a second plunger freely slidable in said bore and terminating in a second piston operating in said counterbore, and a valve for bypassing air from said cylinder to said second piston to project said second plunger from the lower end of said plunger to project the seed clear of the fruit when said piston approaches its limit of down travel.

11. A structure as defined in claim 10, a passage formed through said plunger into said counterbore below said second piston to pass air under pressure from the lower end of said cylinder to raise said second piston and second plunger and to provide a blast of air to clear the fruit holding and supporting area of fragments of fruit.

12. A structure as defined in claim 11, a sleeve surrounding the initial projecting portion of said plunger and having an air connection and control means therefor, for providing a blast of air to discharge the fruit and to clear the rollers of fragments of fruit.

13. In a fruit pitting machine; a support having a discharge opening and a flexible gate for covering and uncovering said opening and means for retracting and advancing said gate to respectively uncover said opening for discharge of a fruit and to cover said opening for support of the fruit; a circular series of rollers mounted on vertical axes over said support and advanceable toward the axis of said opening to hold the fruit, and retractable from said axis to freely receive the fruit, and means for advancing and retracting said rollers, and means for rotating said rollers during advancive and retractive movements for respectively orienting the fruit and for freeing the fruit for discharge; the lower ends of said rollers being closely related to said support to grip the fruit throughout the major portion of its length.

14. A structure as defined in claim 13; means inclining said rollers outwardly at the upper end when said rollers are retracted for free acceptance of a fruit therebetween from above.

15. Means for orienting, locating and centering a single fruit for pitting comprising; a support for the fruit; a circular series of rollers mounted on vertical axes, about a common center over said support, and means for retracting said rollers relative to said common center and moving coincidently inclining said rollers to an upwardly divergent position relative to said common center for free acceptance of a single fruit; means for advancing said rollers toward said common center to locate and center said fruit, and means for coincidently rotating said rollers to orient said fruit in a predetermined position over said common center, and for rotating said rollers during retraction to free the fruit for discharge; the lower ends of said rollers being closely related to said support for gripping the fruit throughout the major portion of its length when the rollers are in their advanced position.

16. A structure as defined in claim 15; a plunger having a through bore terminating at its upper end in a counterbore and an internal plunger freely slidable in said bore and terminating in a piston slidable in said counterbore and means for depressing said plunger to force the seed through the fruit, and for returning said plunger to its uppermost position, and compressed air and control means therefor for depressing said internal plunger to project beyond the lower end of said plunger when said plunger has reached its lowermost position, and to raise said internal plunger and to discharge a blast of air under pressure through the passage in the fruit during the initial period of returning said plunger to its uppermost position.

17. A structure as defined in claim 16; a jet surrounding said plunger and having a compressed air connection and control means therefor for delivering a blast of air to discharge the fruit and to clear the rollers of fragments of fruit.

WIRT D. PEEL.

REFERENCES CITED

The following references are of record in the file of this patent:

UNITED STATES PATENTS

| Number | Name | Date |
|---|---|---|
| Re. 18,675 | Forrest et al. | Nov. 29, 1932 |
| 1,132,817 | Williams | Mar. 23, 1915 |
| 1,438,526 | Herbert | Dec. 12, 1922 |
| 1,527,630 | Cowan | Feb. 24, 1925 |
| 1,725,224 | Sturges | Aug. 20, 1929 |
| 1,924,678 | Curtis | Aug. 29, 1933 |